Oct. 4, 1949.  R. C. KEIRSEY  2,483,909
TILTING ANIMAL CHUTE
Filed Jan. 29, 1945   5 Sheets-Sheet 1

Inventor
Robert C. Keirsey.

By Clarence A. O'Brien
and Harvey B. Jacobson
Attorneys

Inventor
Robert C. Keirsey.

Oct. 4, 1949.　　　　　R. C. KEIRSEY　　　　　2,483,909
TILTING ANIMAL CHUTE

Filed Jan. 29, 1945　　　　　　　　　　　　5 Sheets-Sheet 4

Inventor

Robert C. Keirsey.

By Clarence A. O'Brien
and Harvey B. Jacobson
Attorneys

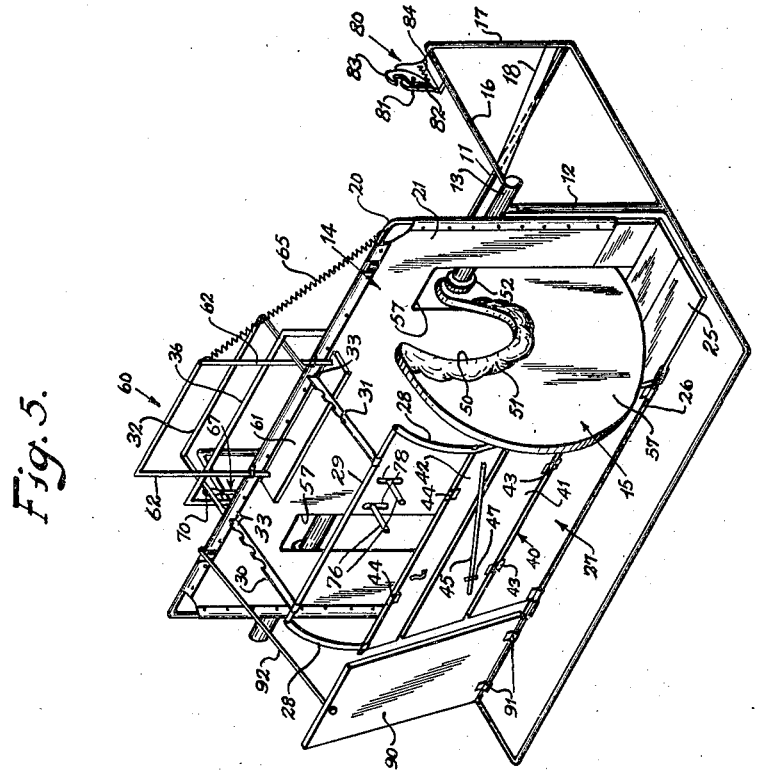
Fig. 5.
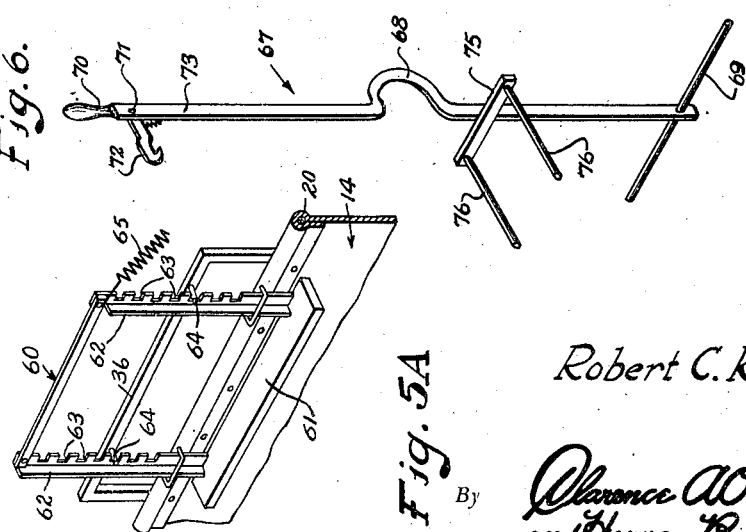
Fig. 6.
Fig. 5A
Inventor
Robert C. Keirsey.
By Clarence A. O'Brien
and Harvey B. Jacobson
Attorneys Patented Oct. 4, 1949

2,483,909

UNITED STATES PATENT OFFICE 2,483,909

TILTING ANIMAL CHUTE

Robert C. Keirsey, Roy, N. Mex.

Application January 29, 1945, Serial No. 575,061

9 Claims. (Cl. 119—98)

This invention relates to a tilting chute, and more particularly to such a chute adapted for the holding of live stock, such as calves, in fixed position, for branding, dehorning, or other operations to be performed thereon.

A primary object of this invention is the provision of an improved chute adapted to securely retain the calf or other animal in position therein, and provided with means whereby the same may be tilted in such wise that the animal may be positioned on its side for operation thereon.

An additional important object of the invention is the provision of an improved pivoted gate adapted to hold the animal's head securely in position for dehorning, or the like.

A still further object of the invention is the provision of such a tilting chute having in association therewith a leg separator, and a holder, adapted to separate the animal's rear legs and hold them fixedly in separated position.

A still further object of the invention is the provision in such a device of a back rest or support, adapted to be positioned against the back of the animal, to prevent the animal from sliding too far outwardly with respect to the securing members, comprising a portion of this invention, when the chute is tilted.

A further important object of the invention is the provision of such a chute provided with interchangeable parts, whereby the same may be conveniently utilized to place the animal on either its right or left side for branding or analogous operations.

A further object is the provision of such a device, which is relatively compact and small in size, whereby the same may be conveniently transported.

A still further object resides in the provision of such a device which will be sturdy and durable in construction, reliable and efficient in operation, and relatively simple and inexpensive to manufacture and assemble.

Other objects reside in the combinations of elements, arrangements of parts, and features of construction, all as will be more fully pointed out hereinafter and disclosed in the accompanying drawings wherein there is shown a preferred embodiment of this inventive concept.

In the drawings:

Figure 5 is an isometric view, and

Figure 5A is a fragmentary, detailed perspective view of the back rest of the device, and the mounting therefor.

Figure 6 is a perspective view of a constructional detail.

Similar reference characters refer to similar parts throughout several views of the drawings.

Figure 1:
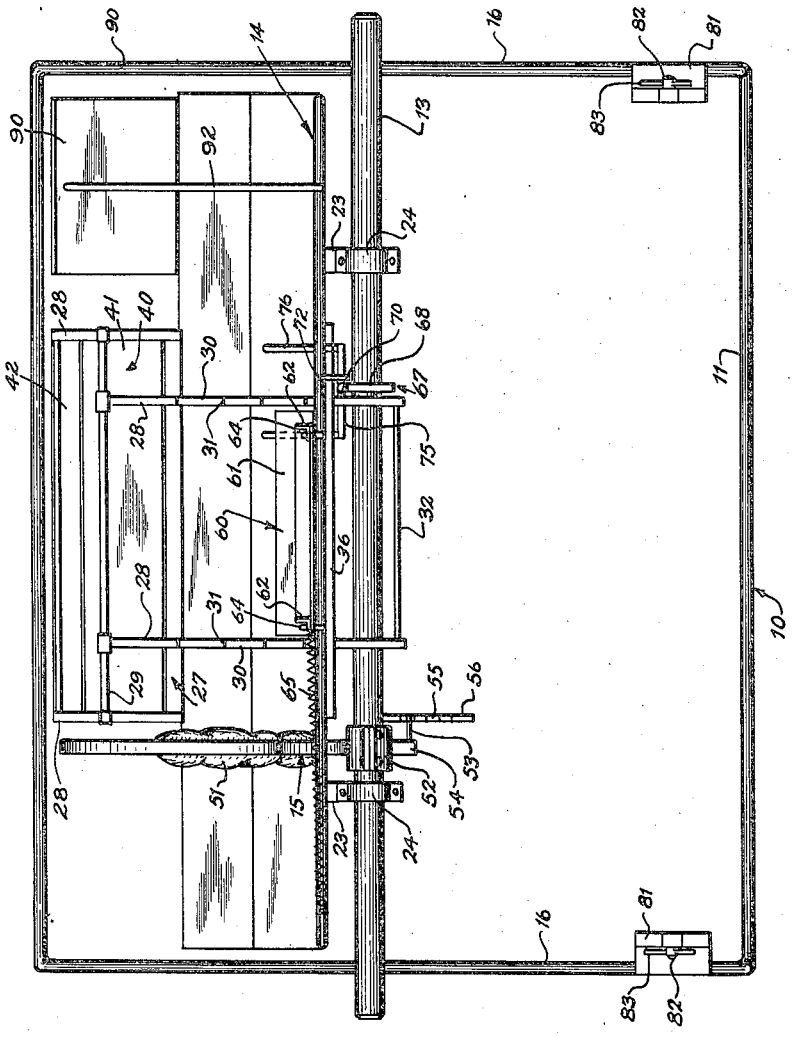
Figure 1 is a top plan view of one form of device embodying the instant inventive concept.

Having reference now to the drawings, the device of the instant invention is comprised of a frame, generally indicated as 10, which includes a base 11 from the opposite sides of which extend a pair of uprights 12. Extending between the uprights 12 is a shaft 13, upon which is pivotally mounted a tiltable side plate or member, generally indicated as 14, and a rotatable gate, generally indicated as 15, both of which will be more fully described hereinafter.

Extending transversely from each of the uprights 12 is a horizontal supporting bar 16 terminating in an upright 17, the lower extremity of each of which is secured adjacent a corner of the rectangular base 11. Diagonally disposed reinforcing member 18 extends between the inner extremities of the members 16 and the lower extremity of the members 17.

Figure 2:
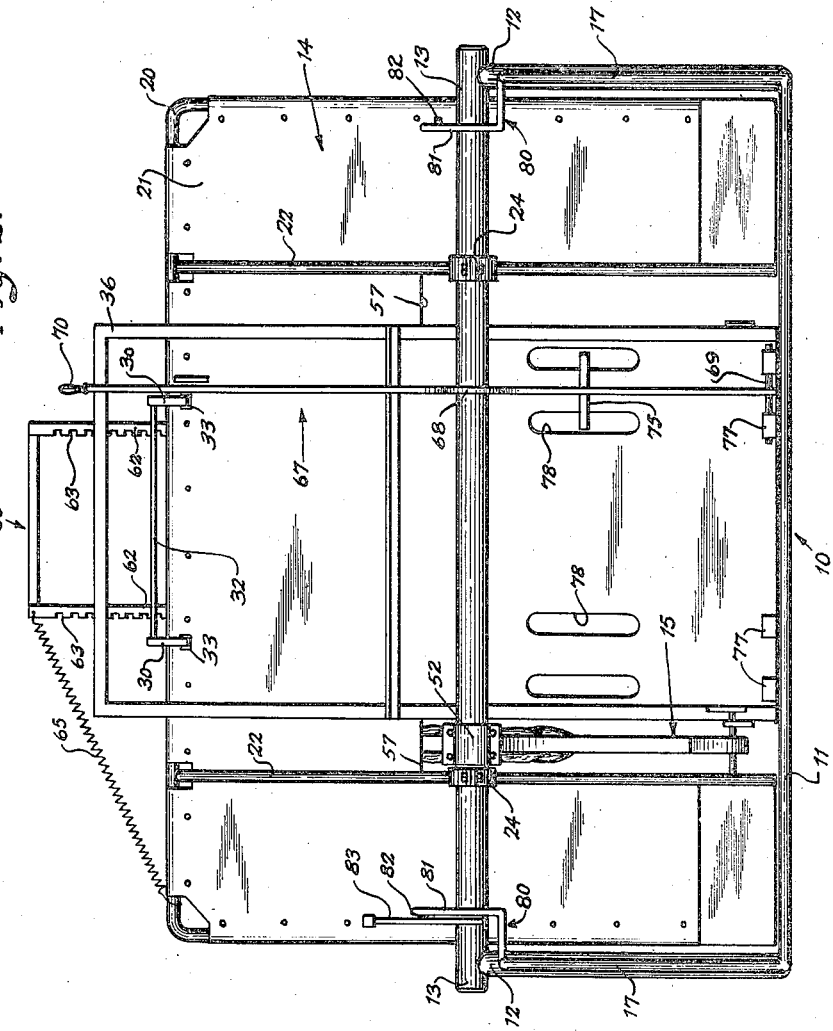
Figure 2 is a side elevational view of the device shown in Figure 1.

The tiltable plate 14 is comprised, as best shown in Figure 2, of a frame 20, adapted to be covered by a wall portion 21, which may be constructed of sheet metal, or the like, to contain the animal in the chute. Reinforcing bars 22 extend transversely across the member 14, and are each provided, as best shown in Figures 1 and 2, with extending brackets 23, secured thereto and including collars 24 adapted to surround the main axle 13, in such manner that the device may be rotated about the axle 13 from a full line position shown in Figure 2 to that indicated in dotted lines in Figure 4.

Figure 3:
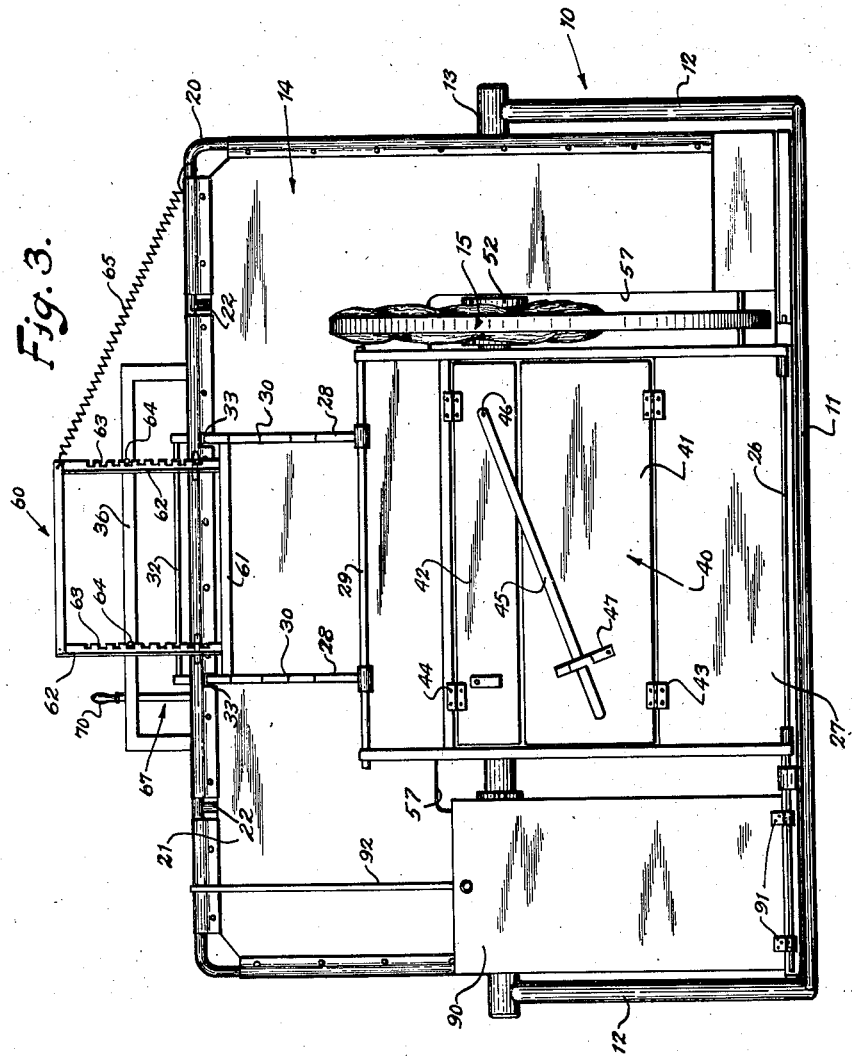
Figure 3 is a side elevational view of the opposite side of the device.

The lower portion of the plate 14 is provided with an extending plate or member 25 to which is pivotally secured as by a pivot rod 26, a squeeze side generally indicated as 27. As best shown in Figure 3, the squeeze side 27 includes a pair of frame members 28, to the upper extremity of which are pivoted, as by a pivot 29 (see Figure 4), a pair of extending bars 30 provided with notches 31, and connected at their extremities by a transverse bar 32. The members 30 are adapted to extend through suitable apertures 33 (see Figure 5) in the plate 14, and the notches 31 are adapted to be engaged with the upper transverse bar of the frame member 20, to secure the squeeze side 27 in adjusted position, for a purpose and in a manner to be more fully described hereinafter.

The upper portion of the plate 14 is provided with a metallic handle member 36, adapted to be grasped for tilting the device in a manner and for a purpose to be more fully described hereinafter.

The squeeze side 27 is provided at an intermediate portion with a door, generally indicated as 40, and comprised of two separable sections 41 and 42 hinged as at 43 and 44, respectively, and provided with a latch member 45 pivoted as at 46 to door section 42 and removably engaged with a catch 47 on door section 41 to hold the door members 41 and 42 in closed position, but releasable in order to permit the door to be opened when desired.

Having reference now to the gate member 15, as best shown in Figures 1 and 5, it will be seen that this is comprised of a roughly semi-circular member, provided with an arcuate cut-away portion 50, adapted to engage the neck of a calf, or similar animal, and padded as at 51 to prevent injury to the animal. A collar 52 is provided surrounding a suitable aperture in a central portion of the straight face of the gate member 15, and is adapted to surround the axle 13 for pivotal movement thereabout. The lower extremity of the member terminates in a lug 53 provided with a pin 54 adapted to engage successively in serrations 55 in a projecting member 56, secured to the frame 10. Suitable slots 57 are provided in member 14, in order to permit swinging passage of the gate member 15 therethrough.

A back rest, generally indicated at 60, is also provided in order to accommodate calves, or other live stock of various heights, and preclude their slipping out of the device when the same is tilted. The back rest 60 takes the form of a transversely extending plate 61 positioned adjacent the upper extremity of the member 14 and on the side thereof adjacent the squeeze side 27, to which are secured a pair of uprights 62, provided with serrations 63, adapted to engage pin 64 carried by the handle member 36. A compression spring 65 extends between the upper extremity of one of uprights 62 on the side adjacent the serrations and an opposite corner of the frame member 20, thus biasing the device toward the pin 64, to hold it in adjusted position.

Means are also provided in association with the device for separating the rear legs of the animal for doctoring, and for securely holding the animal in position. Such means take the form of an extending bar or rod 67, provided at its lower extremity with a transverse pin 69 adapted to be secured alternatively to suitable brackets 77 in the frame 10 and serve as a pivot for the lever. A loop or bend 68 is provided to permit the device to pass around the main axle 13. A handle 70 has pivotally secured, adjacent thereto, as on a pivot 71 a latch member 72 biased by a spring 73 towards the handle member 36 for latching thereover.

The lower portion of the rod or lever 67 is provided with a transversely extending bar 75 from which two protruding arms 76 extend at right angles, and are adapted to pass through suitable apertures 78 in the wall of the member 14, and pass between the legs of the animal being held in the device.

Figure 4:
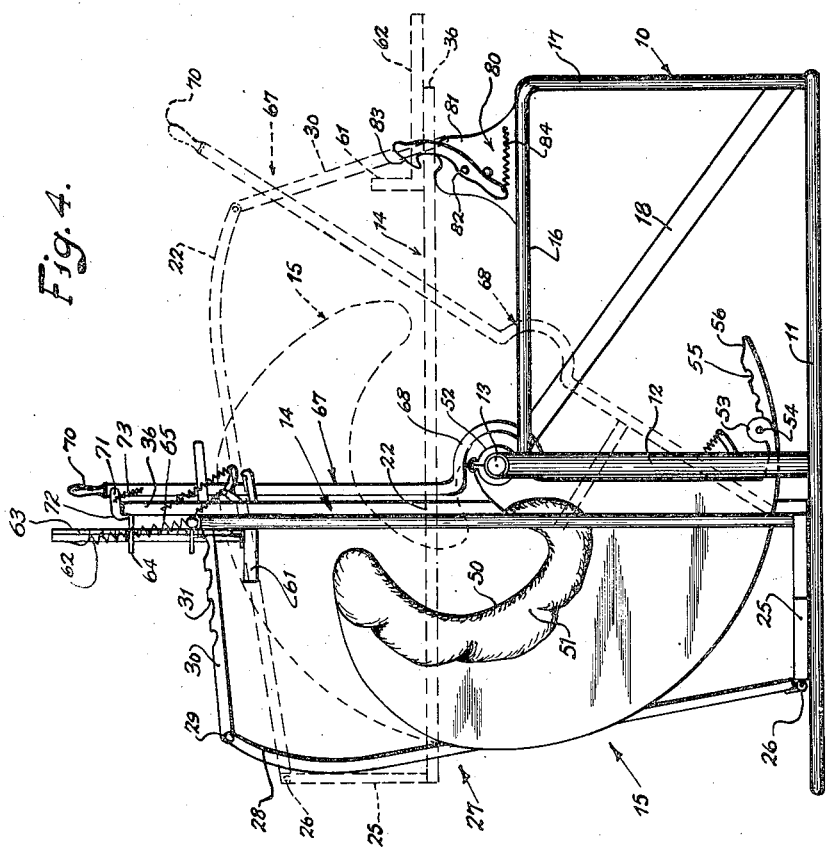
Figure 4 is an end elevational view of the device.

Suitable latch means 80 are provided for holding the device in tilted position, and take the form, as best shown in Figure 4, of brackets 81 extending upwardly from the members 16 to which are pivotally secured as by pivots 82, latch members 83, biased as by springs 84 in towards latching engagement with the top rail of the frame member 14 when the same is in tilted position. Either one or two of these latch members may be provided as desired.

A guide board 90 is also provided adapted to have its lower extremity secured to the pin 26 as by means of hook 91 and its upper extremity secured as by a rod 92 to the upper extremity of the tiltable side plate 14.

From the foregoing the method of the operation and the use of the device should now be readily understandable. When it is desired to operate on a calf or other animal, the same is driven between the side plate 14 and the squeeze side 27, until its neck passes within the arcuate padded interior surface of the gate 51, which gate is then swung about the axle 13 until the animal's neck is held firmly against the side plate member 14. The device is then latched in position by engagement of the pin 54 with one of the serrations 55 of member 56. The squeeze side 27 is then rotated about pivot point 26 until the body of the animal is firmly clamped between the sides of the device, the latching members 31 engaging the frame 20 of the plate 14, and the back rest 60 is suitably adjusted, until the same seats firmly against the back of the animal. The leg separating member 67 is then biased from the position shown in dotted lines in Figure 4 to that shown in full lines, whereupon the arms or projections 76 serve to separate the legs of the animal, and hold them in separated position.

Thus, it will be seen that the animal is firmly held in the device in such manner as to be incapable of movement in any direction. The device is then tilted to the position shown in dotted lines in Figure 4, and the upper transverse frame member 20 of the side plate 14 is engaged by the latch 83, thus tilting the animal to its side and making all parts of the body thereof readily available for operation as desired. The head of the calf is in convenient position for dehorning, or the like, and the body portion of the calf may be readily reached by opening the gates or doors 40 for branding or other operations.

Obviously, the device may be utilized for operation on either the right or left-hand side of the calf or similar animal by merely changing the position of the gate member 15 to the opposite end of the device, and correspondingly reversing the position of the leg separating member 67, and the guide board 90.

Equally obviously, the device may be made in any desired size to accommodate any desired size of animal, and of any suitable material.

From the foregoing it will now be seen that there is herein provided an improved tilting chute, adapted to securely hold a calf or other animal during the performance of operation, of any desired sort, which accomplishes all of the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a device of the character described in combination, a frame, a main axle thereon, a side member pivotally secured on said axle for rotation thereabout, a squeeze side pivotally secured to said side member, a gate secured to said axle and swingable thereabout to engage the neck of an animal, and said gate having an arcuate outer edge and formed with a padded, arcuate, neck engaging aperture therein.

2. In a device of the character described in combination, a frame, a main axle thereon, a side member pivotally secured on said axle for rotation thereabout, a squeeze side pivotally secured to said side member, a gate secured to said axle and swingable thereabout to engage the neck of an animal, said gate having an outer arcuate edge and formed with a padded, arcuate, neck engaging aperture therein, and latch means selectively holding said gate in adjusted position.

3. In a device of the character described in combination, a frame, a main axle thereon, a side member pivotally secured on said axle for rotation thereabout, a squeeze side pivotally secured to said side member, a gate secured to said axle and swingable thereabout to engage the neck of an animal, and a leg catch adapted to separate the rear legs of an animal secured between said side member and said squeeze side.

4. In a device of the character described in combination, a frame, a main axle thereon, a side member pivotally secured on said axle for rotation thereabout, a squeeze side pivotally secured to said side member, a gate secured to said axle and swingable thereabout to engage the neck of an animal, and a leg catch adapted to separate the rear legs of an animal secured between said side member and said squeeze side, said catch including a bar having projecting arms thereon pivotally secured to the lower portion of said frame.

5. In a device of the character described in combination, a frame, a main axle thereon, a side member pivotally secured on said axle for rotation thereabout, a squeeze side pivotally secured to said side member, a gate secured to said axle and swingable thereabout to engage the neck of an animal, and a leg catch adapted to separate the rear legs of an animal secured between said side member and said squeeze side, said catch including a bar having projecting arms thereon pivotally secured to the lower portion of said frame, and latch means on said bar engageable with said side member.

6. In a device of the character described in combination, a frame, a main axle thereon, a side plate pivotally secured on said axle for rotation thereabout, a squeeze side pivotally secured to said side plate, a gate secured to said axle and swingable thereabout to engage the neck of an animal, said gate having an outer arcuate edge and formed with a padded, arcuate, neck engaging aperture therein, a leg catch adapted to separate the rear legs of an animal secured between said sides, and a back support secured to the top of said side plate.

7. A chute for confining animals comprising a frame, a main axle thereon, a side member pivotally secured on said axle for rotation thereabout, a base for the side member, a squeeze side pivotally secured to the base, a gate having an animal neck-engaging notch secured to the axle and rotatable thereabout, and releasable means for securing the squeeze side with relation to the side member.

8. A chute for confining animals comprising a frame, a main axle thereon, a side member pivotally secured on said axle for rotation thereabout, a base for the side member, a squeeze side pivotally secured to the base, a gate having an animal neck-engaging notch secured to the axle and rotatable thereabout, latch means for securing the gate in adjusted position, and releasable means for securing the squeeze side with relation to the side member.

9. A chute for confining animals comprising a frame, a main axle thereon, a side member pivotally secured on said axle for rotation thereabout, a base for the side member, a squeeze side pivotally secured to the base, a gate having an animal neck-engaging notch secured to the axle and rotatable thereabout, latch means for securing the gate in adjusted position including a pin on the gate releasably engageable with a notched extension on the frame, and releasable means for securing the squeeze side with relation to the side member.

ROBERT C. KEIRSEY.

REFERENCES CITED

The following references are of record in the file of this patent:

UNITED STATES PATENTS

| Number | Name | Date |
| --- | --- | --- |
| 1,135,004 | Flatley | Apr. 13, 1915 |
| 1,388,258 | Hasty | Aug. 23, 1921 |
| 1,455,101 | Barlow | May 15, 1923 |
| 2,000,122 | Cameron | May 7, 1935 |
| 2,084,255 | Johnson | June 15, 1937 |
| 2,268,707 | Huckelbridge | Jan. 6, 1942 |